March 28, 1944.  E. LODWIG  2,345,204
INTERIOR CHAMBER INSULATION
Filed April 2, 1942  3 Sheets-Sheet 1
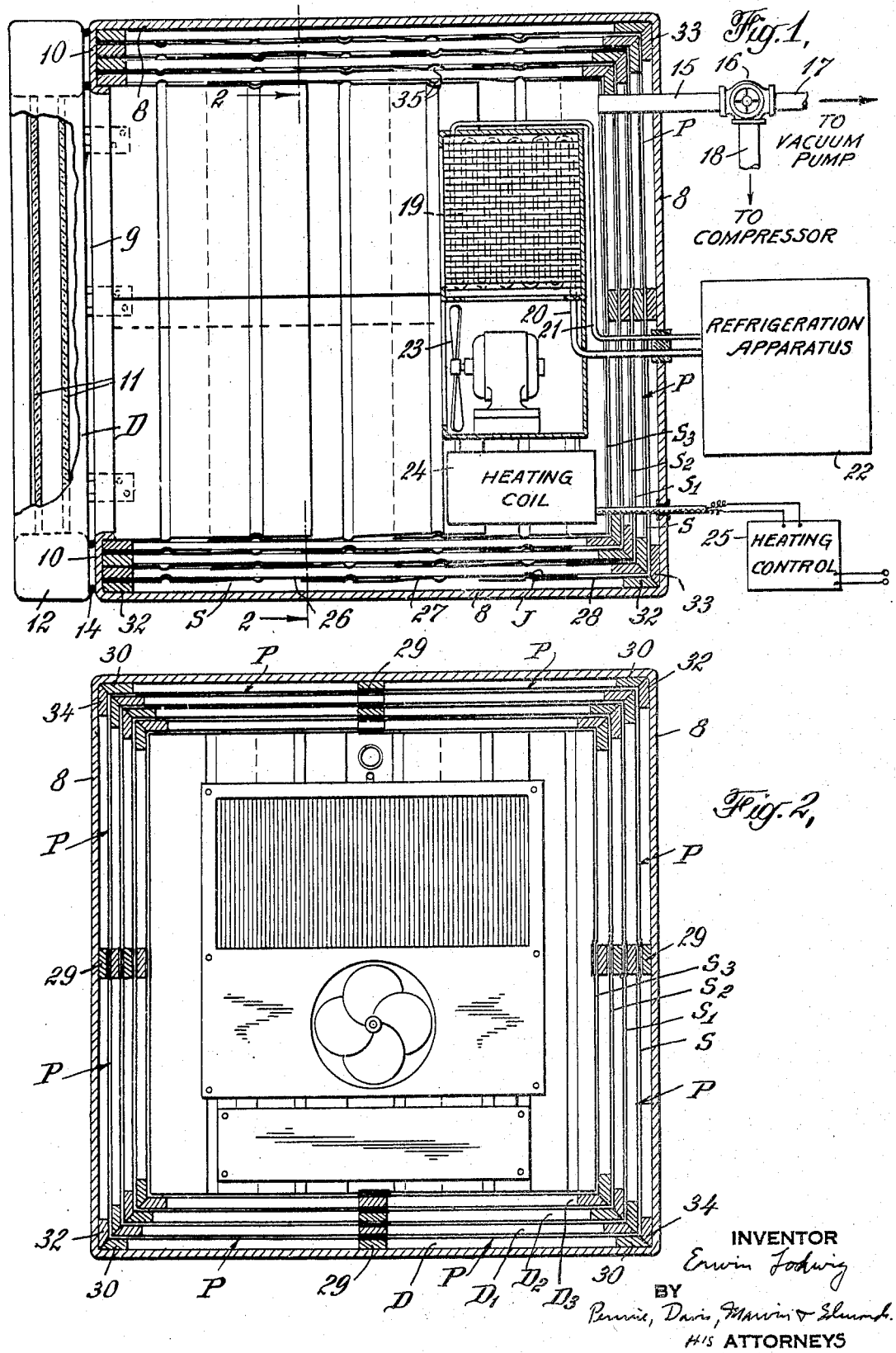

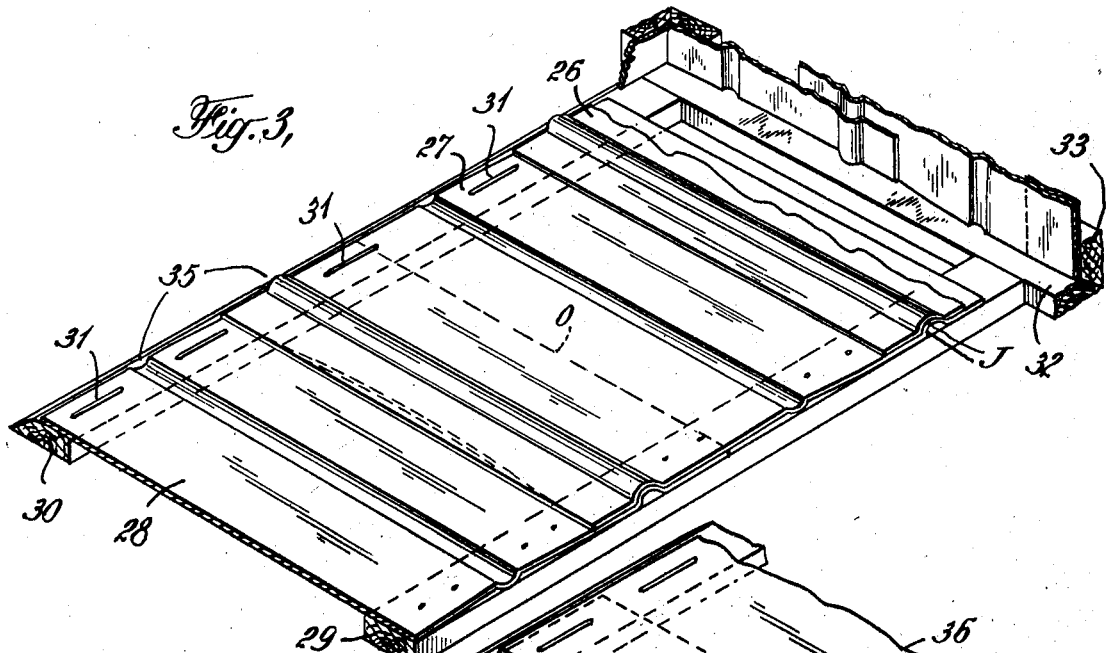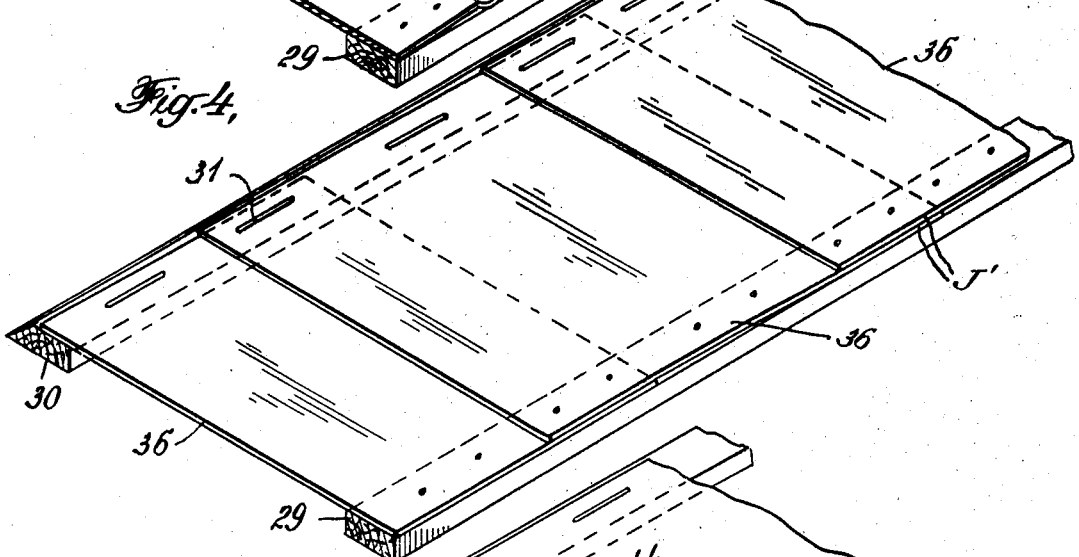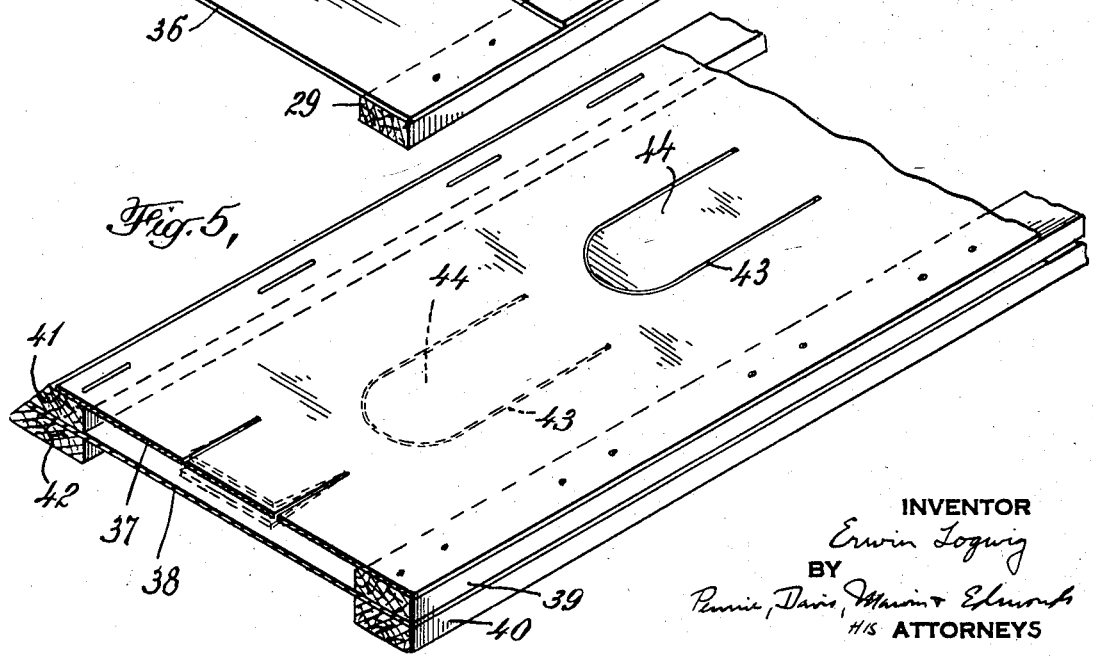

March 28, 1944. E. LODWIG 2,345,204
INTERIOR CHAMBER INSULATION
Filed April 2, 1942 3 Sheets-Sheet 3
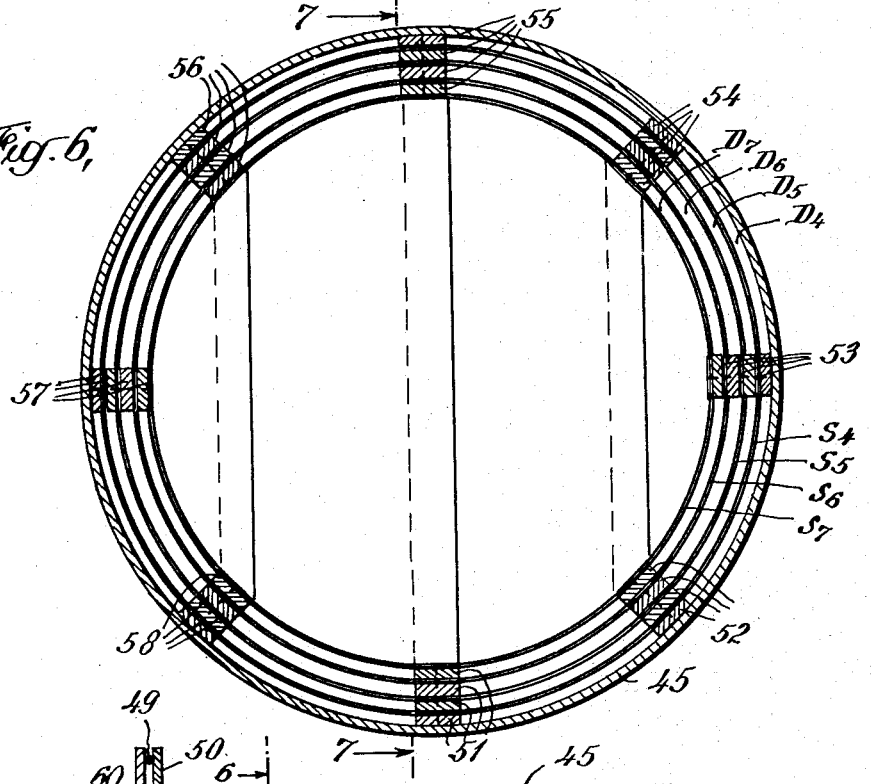
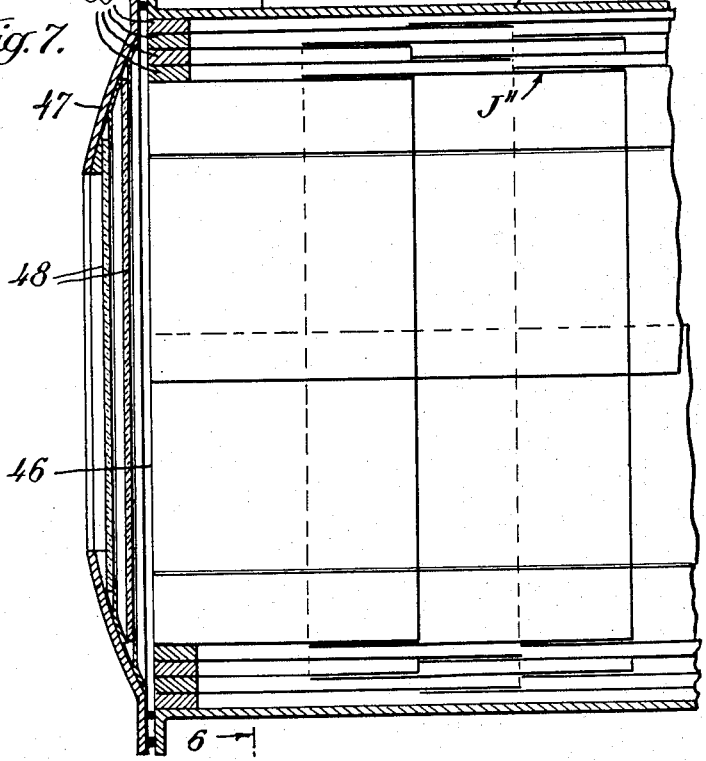
INVENTOR
Erwin Lodwig
BY
Pennie, Davis, Marvin & Edmonds.
HIS ATTORNEYS Patented Mar. 28, 1944

2,345,204

UNITED STATES PATENT OFFICE 2,345,204

INTERIOR CHAMBER INSULATION

Erwin Lodwig, Franklin Square, N. Y., assignor to Mobile Refrigeration, Inc., New York, N. Y., a corporation of New York Application April 2, 1942, Serial No. 437,343

7 Claims. (Cl. 220—9)

This invention relates to the heat insulation of closed containers, and more particularly concerns an improved heat insulating construction for a chamber subjected to rapid pressure and temperature variations over considerable ranges.

In the development and testing of aircraft and of instruments and equipment for use on aircraft and on balloons for meteorological observation, it is frequently necessary to subject such instruments and equipment, and even complete aircraft assemblies, to the widely varying conditions of pressure and temperature that are met with in actual operation. These conditions encountered in flight vary from the maximum atmospheric pressures and temperatures that prevail at sea level in warm climates to the extremely low temperatures and pressures encountered at high altitudes and in polar regions.

At the high altitudes attained in modern flight, minimum air temperatures well below 100 degrees below zero Fahrenheit may be encountered, and the atmospheric pressure may fall below four inches of mercury. In order to properly test, calibrate, and develop instruments and devices for use under these conditions, it is necessary to subject them to temperatures and pressures well below the values indicated. Modern military aircraft are capable of very rapid ascent and descent and accordingly a reproduction of flight conditions involves rapid pressure and temperature changes over the wide ranges indicated.

I have developed an improved pressure chamber for providing the varying temperature and pressure conditions necessary in the testing and development work described, and the present invention concerns the heat insulation of such a chamber. The pressure retaining wall structure of such a chamber is preferably formed of metal and must have sufficient mass to withstand the very considerable differences in pressure within and without the chamber during operation. The metallic wall structure has considerable heat absorbing capacity, and if directly exposed to the chamber atmosphere it increases the heat load on the refrigerating equipment and thus increases the time required to produce a given change in temperature within the chamber. In large size chambers the heat load imposed by the pressure retaining wall structure represents a material loss in refrigerating effect and necessitates the use of refrigerating equipment of very large capacity.

It is impractical to insulate the chamber wall structure from the chamber atmosphere by previously known means. The rapid variations in the chamber air pressure produce expansion and contraction of the insulating material or of parts or supports thereof. The temperature changes result in condensation of water in and on the insulation, and these factors combined with the effects of the pressure changes produce physical failure or loss of insulating effectiveness in known insulating materials and structures.

In accordance with the present invention, it is proposed to provide a pressure chamber for use in testing and development work of the type described in which the relatively massive pressure retaining wall structure is effectively heat insulated from the chamber atmosphere by insulation of an improved nature capable of withstanding rapid pressure and temperature variations over wide ranges and the condensation of water and physical movement incident to such variations, all without physical deterioration or loss of heat insulating effectiveness.

The insulating structure preferably comprises a plurality of superimposed spaced sheets or layers of thin heat reflecting material, the sheets forming superimposed dead air spaces covering the inner surface of the wall structure, and incorporating vent means for permitting air flow to equalize the pressure in the several dead air spaces and the chamber when the pressure is altered, while preventing the flow of convection or other ambient air currents between the several dead air spaces. The invention further contemplates the provision of improved forms of self-closing vent devices for permitting the described pressure equalization, which devices preferably comprise a part of the insulating sheet structure.

The above noted and other objects of the invention will be best understood by reference to typical embodiments thereof described in detail below and illustrated in the drawings, wherein Fig. 1 is a sectional side elevation of an insulated pressure chamber embodying the invention, with cooling, heating and pressure varying means therefor diagrammatically illustrated;

Fig. 2 is a sectional view taken along the line 2—2 of Fig. 1 and viewed in the direction of the arrows;

Fig. 3 is a perspective view of a portion of the heat insulating structure employed in the chamber of Figs. 1 and 2;

Fig. 4 is a perspective view similar to Fig. 3, showing a different form of sheet material;

Fig. 5 is a perspective view similar to Figs. 3 and 4, showing a modified form of venting means in the insulating sheet structure;

Fig. 6 is a sectional view illustrating the application of the invention to a cylindrical chamber; and Fig. 7 is a sectional side elevation of a part of the chamber illustrated in Fig. 6, taken along the line 7—7 of Fig. 6.

The embodiment of the invention illustrated in Figs. 1, 2, and 3 of the drawings comprises a rectangular test chamber, the pressure retaining wall structure of which may comprise a plurality of steel wall plates 8 of sufficient mass to withstand atmospheric pressure when the chamber is substantially evacuated without appreciable bending of the walls. The wall plates may be welded or otherwise tightly joined at their edges. An access opening 9 is provided at one end of the chamber and the wall plates may be bent inward to provide a door flange 10 around this opening as shown. A suitable pressure-tight door D is provided to close the opening 9. Since the chamber illustrated may be used for the testing and development of indicating instruments and other devices requiring visual observation while under test, the door D has a transparent panel of spaced glass panes 11 suitably fixed to the door frame 12. The door frame 12 may be hingedly secured to the chamber wall structure as indicated and may be held in closed position by suitable latches or clamps of known construction. An air-tight seal between the door and the chamber may be provided in the form of gaskets 14 disposed between the door frame 12 and the flange 10.

The pressure and temperature of the air within the chamber may be altered by any suitable means. In the disclosed embodiment I have diagrammatically illustrated an air duct 15 sealed through an opening in the chamber wall structure and selectively connectable through a valve 16 to either the pipe 17 leading to a vacuum pump or the pipe 18 leading to a source of air under super-atmospheric pressure. A refrigerating coil 19 is shown within the chamber and this may comprise the evaporator of a compression refrigeration system. Refrigerant supply and return lines 20 and 21 pass through and are insulated from the chamber wall as shown in Fig. 1, and serve to connect the coil 19 with a refrigerant compressing and condensing unit located outside the chamber, as diagrammatically illustrated at 22. A fan 23 may be provided for circulating the air in the chamber over the refrigerating coil 19. Heat may be supplied to the air in the chamber by suitable means such as a heating coil diagrammatically illustrated at 24, and the coil may be energized from a suitable source through a control device illustrated at 25, the electrical connections to the coil being sealed in an opening through the chamber wall structure. The heating and refrigerating units may be thermostatically controlled in accordance with the temperature of the air in the chamber by known control devices.

For instrument testing work of the character described, the refrigerating and heating apparatus preferably has sufficient capacity to rapidly vary the temperature of the chamber air through a wide range which may be from 150 degrees below zero Fahrenheit to 160 degrees above zero Fahrenheit, and the vacuum and pressure producing equipment should be capable of rapidly varying the chamber air pressure from a super-atmospheric gauge pressure of about 25 pounds per square inch to a sub-atmospheric pressure of about 1/16th of an inch of mercury absolute.

The connections to the heating and cooling devices and the air pressure varying connection may be sealed through openings in the insulating structure as indicated in Fig. 1, or a small un-insulated wall section may carry these connections if desired. Additional electrical and duct connections through the chamber wall structure may be provided for use in the testing of instruments or devices within the chamber.

Referring now to the insulating structure, this generally comprises a series of substantially parallel superimposed spaced sheets S, $S_1$, $S_2$, $S_3$, of thin heat reflecting material disposed adjacent and substantially parallel to the chamber walls and forming dead air spaces therebetween and between the outermost sheet S and the inner surface of the chamber wall structure. The sheets are constructed or arranged to provide self-closing vents that permit the equalization of air pressure between the several dead air spaces and the chamber proper, and the vents are arranged to close after the pressure has equalized and so prevent the flow of ambient air currents induced by convection or otherwise.

In the embodiment of Figs. 1, 2, and 3, four sheets S, $S_1$, $S_2$, and $S_3$ are provided, although a greater or smaller number of sheets may, of course, be used. Each sheet comprises a plurality of plates of thin flexible material, assembled as hereinafter explained. Various materials may be used to form the sheets. I prefer to use thin gauge steel for this purpose, since it reflects a high percentage of the heat rays that strike it, and also provides the resilience requisite to certain preferred forms of self-closing vents through the sheets. The thin sheet steel plates are preferably rendered non-oxidizing, and to this end, as well as to augment their heat reflecting properties, the plates may be provided with very thin surface coatings of an alloy or mixture of lead and tin. Such coatings have been found to reflect a high percentage of the heat rays incident thereon, and they also protect the steel against oxidation and corrosion. Coated thin steel plates of this type are sold under the trade name "Ferro-Therm" by American Flange & Manufacturing Co., Inc., of New York. The invention is not confined to the use of this specific material, but embraces other heat reflecting sheet materials within the scope of the appended claims.

The super imposed parallel insulating sheets may be considered as forming a plurality of nested box-like chambers with dead air spaces therebetween. For convenience in manufacture and assembly, each sheet is made up of a plurality of panels, one or more panels forming each wall section of each sheet. Since the construction of the several sheets is identical except for dimensions, the panel construction of the outer sheet S only will be described in detail.

The sheet S is made up of a plurality of panels P and in the illustrated case two of these panels form each wall section of the sheet, as shown in Fig. 2. The sheet S is spaced from the chamber wall structure by spacers extending along the edges of the panels. Each panel P comprises a plurality of plates 26, 27, and 28, the opposite side edges of which rest on the parallel spacers 29 and 30 and are secured thereto by staples 31 or equivalent means. As will be apparent from an inspection of Fig. 2, the side edges of plates forming adjacent panels are overlapped and simultaneously attached to the spacers, and the complete sheet is built up in this fashion. A portion of a panel and the juncture between panels of adjacent wall sections is shown in perspective in Fig. 3. The side spacers 29 and 30 preferably comprise wooden strips and they may be fastened to the chamber wall structure by any suitable means. Similar spacers 31 and 32 extend transversely of the panel at its ends and cooperate with the side spacers 29 and 30 to divide the space between the sheets S and the adjacent chamber wall into dead air spaces D (see Figs. 1 and 3). The plates may be sealed to the spacers with mastic or similar material to form airtight connections.

The several plates 26, 27, and 28 of each panel overlap at their ends as shown at J in Figs. 1 and 3, and the overlapping end portions thereof between the spacers 29 and 30 are held in mutual engagement solely by the resilience of the metal plates. With this arrangement, excess air pressure on either side of the sheet moves the plates apart at the overlapping joints J as indicated in the dotted lines at O on Fig. 3, thus forming a vent for pressure equalization. When the air pressures on opposite sides of the sheet have equalized, the resilience of the plates brings them together to close the openings through the overlapping joints, and the flow of ambient air currents through the sheets is prevented by this self-closing action.

The construction and arrangement of the other panels forming the outermost sheet S and of the corresponding panels forming the other sheets $S_1$, $S_2$, and $S_3$ is the same as that described above. The spacers bounding the panels of each sheet hold the several sheets apart and form a plurality of dead air spaces between them, the dead air spaces bounded by the respective sheets S, $S_1$, $S_2$, and $S_3$ being designated D, $D_1$, $D_2$, and $D_3$ in the drawings. The spacers at the corners of the chamber are arranged to support the meeting wall sections of the sheets, and may each comprise two wooden strips with interengaging angularly cut edges as shown at 33 and 34 in Figs. 1, 2, and 3.

The plates forming the several sheets S, $S_1$, $S_2$, and $S_3$ may be provided with re-enforcing ribs 35 as shown in Figs. 1, 2, and 3, these ribs serving to stiffen the plates and permit expansion and contraction thereof without appreciable buckling. The ribs may be interlocked at the overlapping joints J as shown in Fig. 3. The ribbed structure is not essential, and unribbed resilient plates 36 may be used as illustrated in Fig. 4. The ends of the unribbed plates are overlapped as shown in J' and form self-closing pressure equalizing bents in the manner described above in connection with the ribbed plates.

The self-closing vents may be formed directly in the resilient heat reflecting material rather than by overlapping joints between plates of this material as above described. This modification is illustrated in Fig. 5 which shows a pair of superimposed panels in perspective. The panels are formed of continuous plates 37 and 38 of resilient heat reflecting material of the type described, and the plates are suitably secured to spacers 39, 40, 41, and 42, as in the above described modifications. Each panel is provided with one or more U-shaped cuts 43 which partially separate strips or tongues 44 from the sheet material and form self-closing reed type vent valves in the sheets. Excess pressure on either side of a sheet displaces the tongues 44 of the resilient sheet material out of the plane of the sheet and so opens a vent and permits air flow through the sheet until the pressures equalize. The metal tongues then spring back into alignment with the sheets and so close the vents, substantially preventing the flow of ambient air currents between the dead air spaces defined by the sheets.

The described insulating structure may be readily applied to chambers of circular section as illustrated in Figs. 6 and 7. The chamber there shown has a cylindrical wall 45 with a flanged opening 46 at one end, which may be closed by a door 47 having an observation window 48 therein. Gaskets 49 are provided to insure an airtight fit between the door 48 and the chamber flange 50. The chamber wall structure is formed of relatively heavy steel capable of withstanding atmospheric pressure as explained above.

The insulation in the circular section chamber comprises a plurality of superimposed spaced sheets $S_4$, $S_5$, $S_6$ and $S_7$ of heat reflecting resilient material of the type described, the sheets being disposed substantially parallel to and adjacent the inner surface of the cylindrical chamber 45. The sheets are divided into panels by the spacers 51 to 58 inclusive, which run longitudinally of the cylindrical chamber wall, and each panel is made up of several plates with their ends disposed in overlapping relation as shown at J''. The overlapping joints J'' may be staggered as shown in Fig. 7. The superimposed spaced sheets form dead air spaces $D_4$, $D_5$, $D_6$, and $D_7$ therebetween. The ends of the dead air spaces may be closed by spacers 60 extending circumferentially of the chamber between the sheets and engaging the longitudinal spacers 51 to 58.

It is to be understood that the chamber illustrated in Figs. 6 and 7 is provided with means for rapidly altering the temperature and pressure of the air therein over wide ranges, and apparatus such as that illustrated in Figs. 1 and 2 and described above may be used for this purpose. The overlapping joints J'' in the sheets $S_4$, $S_5$, $S_6$ and $S_7$ act as self-closing vents that permit pressure equalization between the chamber and the several dead air spaces while preventing the flow of ambient air currents therebetween, as has been explained above in connection with the chamber of Figs. 1 and 2.

The vented superimposed sheet construction of the present invention acts as an effective heat barrier for insulating the air within test chambers of the type described. The resilient nature of the sheet material permits the formation of self-closing vents for the several dead air spaces by simple and inexpensive overlapping joint or reed valve structures. The vents prevent deformation of the insulating sheets due to pressure differences between the air in the dead air spaces and the chamber proper with the result that the insulating structure does not loosen or disintegrate in use. The condensation of water on the sheets does not reduce the heat insulating efficiency of the structure, and the use of non-corrosive sheet material or coatings prevents rusting of the sheets.

I claim:

1. Apparatus for thermally insulating the wall structure of a chamber subject to variations in interior pressure and temperature comprising, a plurality of spaced substantially parallel superimposed sheets of thin non-corrosive heat reflecting metal covering and extending substantially parallel to and adjacent the inner surface of the wall structure, said sheets forming dead air spaces therebetween, and self-closing vents in said sheets, openable by excess pressure on either side thereof, for permitting equalization of air pressure between the interior of the chamber and the several dead air spaces while preventing the flow of ambient air currents through the sheets.

2. In combination with a chamber having a pressure retaining wall structure of heat conducting material and means for altering the pressure and temperature of the atmosphere within the chamber, means for thermally insulating the chamber comprising a plurality of superimposed spaced sheets of resilient metallic heat reflecting material covering and extending substantially parallel to the inner surface of the chamber wall structure, said sheets forming dead air spaces therebetween, and at least one resiliently openable overlapping joint in each of said sheets, said joints being normally closed by the resilience of said sheets to prevent the flow of ambient air currents between the dead air spaces and the chamber and openable by excess pressure on either side of said sheets to permit equalization of pressure between the several dead air spaces and the chamber.

3. A thermal insulating structure for the interior surface of a wall of a chamber subject to varying air pressures and temperatures comprising, a plurality of superimposed spaced sheets of thin resilient material, spacers extending between said sheets, said spacers being arranged in spaced groups, means for securing said sheets to said spacers and overlapping joints in said sheets between said groups of spacers forming self-closing vents to permit equalization of the air pressure on opposite sides of said sheets.

4. A thermal insulating structure for the interior surface of a wall of a chamber subject to varying air pressures and temperatures comprising, a plurality of superimposed spaced sheets of thin resilient non-corrosive heat reflecting metal, spacers extending between said sheets and dividing the spaces therebetween into a plurality of dead air spaces, said spacers being arranged in spaced groups, means for securing said sheets to said spacers and overlapping joints in said sheets between said groups of spacers forming self-closing vents openable by excess pressure on either side of said sheets whereby differences in pressure between the several dead air spaces and the interior of the chamber are equalized and the flow of ambient air currents through the sheets is prevented.

5. A thermal insulating structure for the interior surface of a wall of a chamber subject to varying air pressures and temperatures comprising, a plurality of superimposed spaced sheets of thin resilient heat reflecting material forming dead air spaces therebetween, and self-closing vents in said sheets comprising resiliently movable tongues normally disposed in and substantially closing openings in said sheets, said tongues being movable in either direction from such openings by excess pressure on either side of said sheets to permit equalization of air pressure between said dead air spaces.

6. A thermal insulating structure for the interior surface of a wall of a chamber subject to varying air pressures and temperatures comprising, a plurality of superimposed spaced parallel sheets of thin resilient heat reflecting metal, spacers extending between said sheets and dividing the spaces therebetween into a plurality of dead air spaces, and self-closing vents in each of said sheets communicating with each of said dead air spaces, each of said vents comprising a movable tongue partly cut from the sheet and normally held in the plane of the sheet by the resilience of the sheet material, said tongue being movable from such plane by excess air pressure on either side of the sheet to permit air to flow through the sheet.

7. In combination with a chamber having a pressure retaining wall structure of heat conducting material and means for altering the pressure and temperature of the atmosphere within the chamber, means for thermally insulating the chamber comprising a plurality of superimposed spaced sheets of resilient metallic heat reflecting material covering and extending parallel to the inner surface of the chamber wall structure, said sheets forming dead air spaces therebetween, and at least one displaceable tongue formed in each of said sheets by a substantially U-shaped cut therein, said tongues normally lying in the planes of said sheets and being resiliently movable to open a vent therethrough by excess pressure on either side thereof, said tongues forming self-closing vents to permit equalization of air pressure between the several dead air spaces and the chamber while preventing the flow of ambient air currents through the sheets.

ERWIN LODWIG.